United States Patent
Lein et al.

(10) Patent No.: US 8,038,222 B2
(45) Date of Patent: Oct. 18, 2011

(54) ACTIVELY VENTILATED VEHICLE SEAT

(75) Inventors: Rudolf Lein, Dachau (DE); Christian Pudenz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/417,039

(22) Filed: Apr. 2, 2009

(65) Prior Publication Data

US 2009/0243365 A1 Oct. 1, 2009

Related U.S. Application Data

(63) Continuation of application No. PCT/EP2007/007851, filed on Sep. 8, 2007.

(30) Foreign Application Priority Data

Oct. 6, 2006 (DE) .......................... 10 2006 047 370

(51) Int. Cl.
*A47C 7/02* (2006.01)
(52) U.S. Cl. .......... 297/452.46; 297/452.43; 297/452.42
(58) Field of Classification Search ............. 297/452.42, 297/452.43, 452.46, 452.47
See application file for complete search history.

(56) References Cited

U.S. PATENT DOCUMENTS

| 6,206,465 B1 * | 3/2001 | Faust et al. ................ 297/180.14 |
| 6,619,737 B2 * | 9/2003 | Kunkel et al. ............ 297/180.14 |
| 6,817,675 B2 * | 11/2004 | Buss et al. ................ 297/452.6 |
| 2002/0003362 A1 | 1/2002 | Kunkel et al. |
| 2002/0067064 A1 | 6/2002 | Jaillet et al. |
| 2003/0230913 A1 | 12/2003 | Buss et al. |
| 2006/0038432 A1 | 2/2006 | Koehler |
| 2006/0249995 A1 | 11/2006 | Stoewe et al. |

FOREIGN PATENT DOCUMENTS

| DE | 100 24 879 C1 | 10/2001 |
| DE | 101 52 768 A1 | 6/2002 |
| DE | 101 56 658 C1 | 5/2003 |
| DE | 10 2004 039 058 A1 | 2/2006 |
| DE | 10 2005 018 445 B3 | 6/2006 |
| EP | 1 364 827 B1 | 11/2003 |

OTHER PUBLICATIONS

German Search Report dated Jan. 22, 2007 with English translation (nine (9) pages).

* cited by examiner

*Primary Examiner* — Sarah B McPartlin
(74) *Attorney, Agent, or Firm* — Crowell & Moring LLP

(57) ABSTRACT

An actively ventilated vehicle seat includes a lower air-impermeable seat cushion or backrest part, an air-permeable intermediate layer made of a spacer fabric and an upholstered cover. The vehicle seat is divided into upholstered areas which are delimited from each other by seams anchored at the air-impermeable seat cushion. Air bridges are provided which extend transversely to the seams for connecting the intermediate layer between the individual upholstered areas. An unobstructed seat ventilating system and a permanently secure attachment of the seams are achieved in a simple manner in terms of production and without affecting the seating comfort in that the air bridges are integrated all around into the air-impermeable seat cushion and the seams are anchored above the air bridges in the air-impermeable material of the upholstered part covering the air bridges.

8 Claims, 2 Drawing Sheets

ACTIVELY VENTILATED VEHICLE SEAT

This application is a continuation of PCT International Application No. PCT/EP2007/007851, filed Sep. 8, 2007, which claims priority under 35 U.S.C. §119 to German Patent Application No. DE 10 2006 047 370.1, filed Oct. 6, 2006, the entire disclosures of which are herein expressly incorporated by reference.

BACKGROUND AND SUMMARY OF THE INVENTION

The invention relates to an actively ventilated vehicle seat having a lower air-impermeable seat cushion or backrest part, an intermediate layer arranged on the latter, and through which air flows, and an upholstered cover. The vehicle seat is divided by seams into mutually delimited upholstered zones through which air flows on the side of the intermediate layer.

In the case of an actively ventilated vehicle seat of the type known from German patent document DE 100 24 879 C1, the seams or quiltings are constructed as stitch seams in the air-permeable upholstery cover consisting of a flexible-foam layer and the fabric cover. In this case, the drawing-in depth of the seams is limited to the thickness of the upholstery cover. Moreover, no load-resistant anchoring of the seams on the lower upholstered part is present.

Furthermore, an actively ventilated motor vehicles seat is known from European patent document EP 1 364 827 B1, where the upholstery cover is fastened by way of the intermediate layer, through which the air flows, to the lower upholstered part such that, distributed in the longitudinal direction of the seams, studs are screwed to the lower upholstered part and reach through the intermediate layer. The studs are detachably hooked together with quilting rods pulled into the upholstery cover. Although, as a result, major constrictions of the air-guiding intermediate layer are avoided in the area of the seams, the sitting comfort is considerably impaired by the studs projecting upward beyond the intermediate layer.

Finally, in the case of the vehicle seat of the above-mentioned type known from German patent document DE 101 56 658 C1, in the case of which the intermediate layer, through which the air flows, is divided along the seams into individual sections, which are separated from one another with respect to ventilation, insertion strips in the form of spacing textures are arranged in a sunk manner in the lower seat part and extend in conformance with respect to the length of the seams below the seam-side edge sections of the intermediate layer and act as air bridges between the latter. The seams are produced by pull wires, which extend through the insertion strips and are anchored in the lower seat part. However, the production and arrangement of the air-bridge-forming insertion strips requires increased manufacturing expenditures and, since the insertion strips are compressed in a manner narrowing their cross-section by the active pulling forces of the quilting wires, the air exchange between the individual sections of the intermediate layer may be impaired.

It is an object of the invention to achieve an unhindered seat ventilation and a durably secure fixing of the seams in a manner that is simple with respect to the manufacturing and does not impair the sitting comfort in the case of such an actively ventilated vehicle seat.

According to the invention, an actively ventilated vehicle seat, having a lower air-impermeable seat cushion or backrest part, an intermediate layer through which air flows, and an upholstered cover which, via seams anchored on the lower seat cushion, is divided into mutually delimited upholstery zones. Air bridges extend between the individual upholstery zones transversely to the seams for connecting the intermediate layer. The air bridges are enclosed all around by the air-impermeable seat cushion, and the seams are anchored above the air bridges in the air-impermeable material of the upholstered part covering the air bridges.

According to the invention, the air bridges of the air-guiding intermediate layer are fully enclosed by the air-impermeable material of the upholstered part, and the seams are anchored above the air bridges to wall sections of the upholstered part covering the air bridges. As a result, a durably pull- and slide-resistant fastening of the upholstery cover along the seams is ensured without any stressing of the air bridges in a cross-section-constricting manner by the tension forces resulting from the quilting. This leads to an unhindered air flow through the intermediate layer on the path via the air bridges, while the sitting comfort is simultaneously high in connection with a seat construction that is simple with respect to its manufacturing and remains stable for a long time.

In a further development of the invention preferred with respect to the manufacturing, the air bridges and the intermediate layer are prefabricated as a one-piece blank, specifically normally consisting of a spacing textured material.

For the purpose of a particularly secure fastening of the seams to the air-impermeable seat part, it is recommended to anchor these seams on a seam element which extends continuously along the seams in the air-impermeable part above the air bridges.

The air-impermeable upholstered part preferably consists of a foam material. In order to prevent the foam material from penetrating into the air bridges during the foaming process, which air bridges are surrounded by its flow, and, as a result impairing or even blocking the air guidance in the air bridges, the contact surfaces of the air bridges on the foamed-material side advantageously have a design that is impervious to foam.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 3:
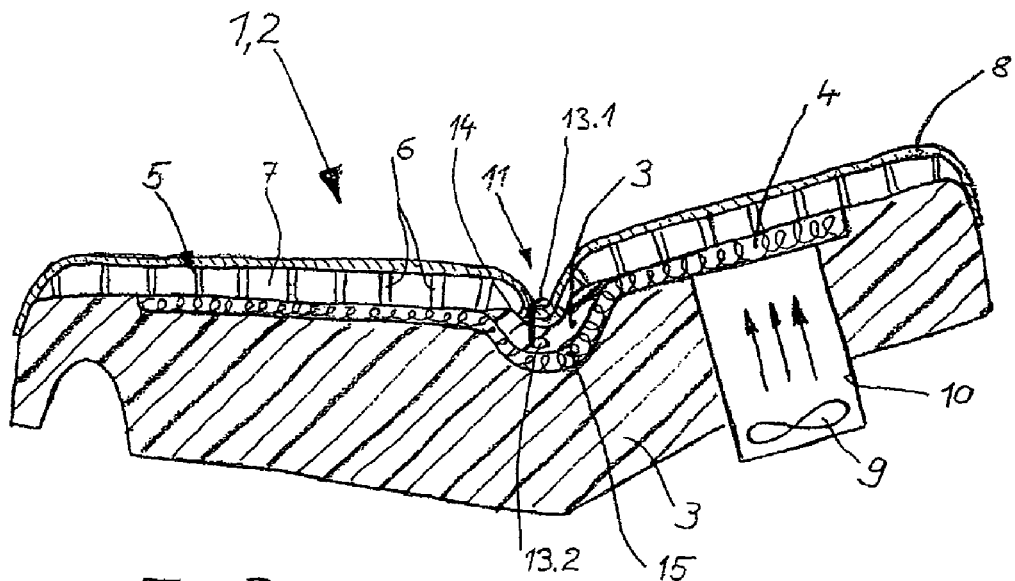
FIG. 3 is a simplified schematic sectional view transversely to one of the seams of the vehicle seat illustrated in FIG. 1.

The actively ventilated vehicle seat illustrated in the figures consists of a seat module and a backrest module 1, 2, which each contain a lower or bottom air-impermeable upholstered part 3 of a foam material, an intermediate layer 4 of a wide-meshed spacing texture (spacer fabric) which covers the upholstered part 3 in the cross-hatched surface areas and through which air flows, as well as an upholstery cover through which air flows on the intermediate-layer side and which, as a whole, has the reference number 5 (see FIG. 3). The upholstery cover 5 has a foam material padding 7 through which air openings 6 penetrate. The upholstery cover 5 also has a cover material 8 which stretches over the foam material padding 7.

Figure 1:
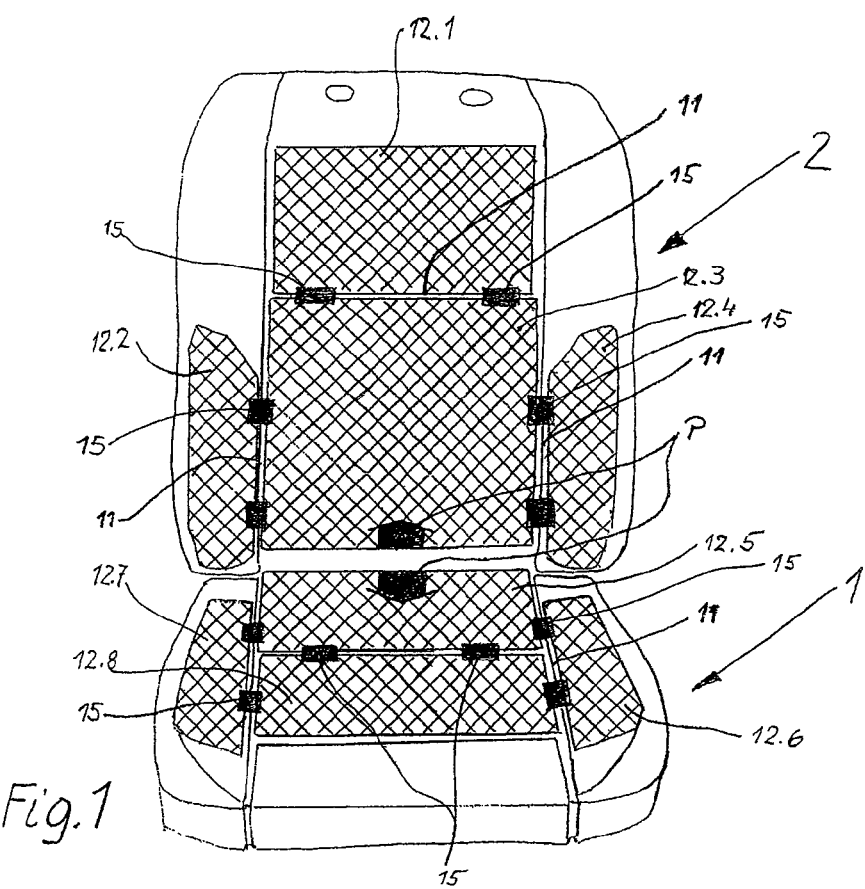
FIG. 1 is a simplified schematic perspective view of an actively ventilated vehicle seat according to the invention having a spacing texture in the cross-hatched surface areas, air flowing through this spacing texture.

The air supply to the spacing texture 4 of the seat module and the backrest module 1, 2, respectively, takes place, for example, at air inlet points indicated by arrows P in FIG. 1 by way of mini-fans 9 (FIG. 3) in an air shaft 10 formed in the upholstered part 3.

For tensioning the upholstery cover 5, transversely and longitudinally extending seams 11 are provided on the seat module and on the backrest module 1, 2. The seams 11 divide the upholstery cover 5 into individual, mutually delimited, upholstery zones 12.1 . . . 12.8. In each case, the seams have a seam wire 13.1 which runs through on the side of the upholstery cover 5. The wire 13.1 is braced under tension by tension-proof seam clamps 14, which, however, are flexible in the pressure direction, with another seam wire 13.2 which is continuously embedded in the upholstered part 3.

The surface sections of the intermediate layer 4 situated in the individual upholstery zones 12 are connected with one another via the air bridges 15 (shown in a blackened manner in FIG. 1) extending below the seams 11 transversely to the seams to allow air to flow through the zones. So that the air exchange by way of the air bridges 15 will not be impaired by the anchoring of the seams 11 on the upholstery part 3, the air bridges 15 are completely, thus also on the top side facing the upholstery cover 5, enclosed in the foam material of the upholstery part 3. And, as most clearly illustrated in FIGS. 3 and 4, the seams 11 are anchored in the material of the upholstered part 3 above the air bridges 15. As a result, the air bridges 15 are kept free of the tension forces generated by the seams 11, and a sufficient ventilation of all upholstery zones 12 is ensured.

Figure 4:
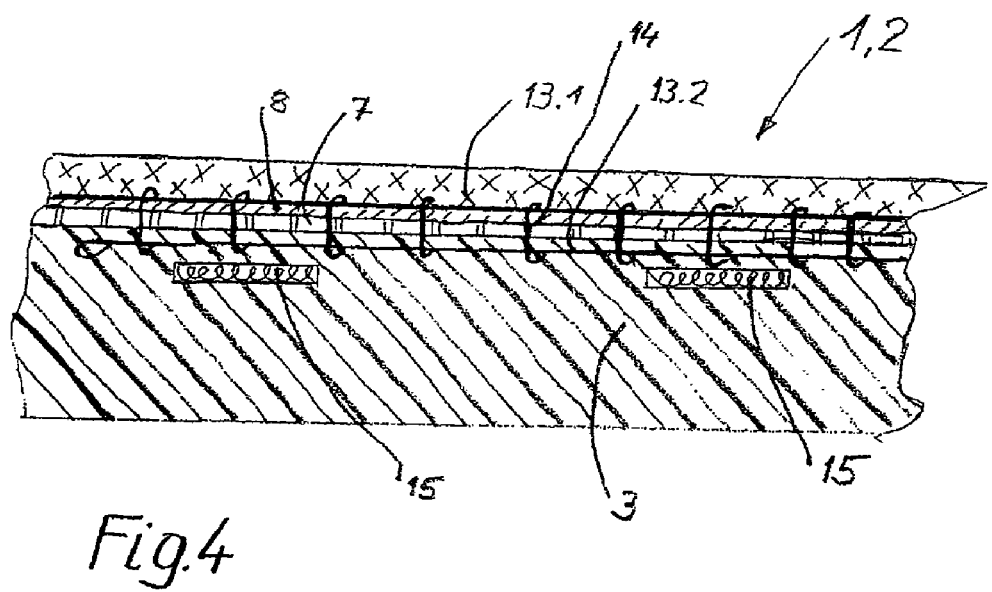
FIG. 4 is a simplified schematic sectional view along one of the seams of the vehicle seat illustrated in FIG. 1.

As illustrated in FIG. 4, the width of the air bridges 15 in the longitudinal direction of the seams 11 is significantly less than the length of the laterally adjoining areas of the upholstery part that are free of air bridges, so that the main portion of the seam forces is not absorbed by the narrower-dimensioned wall sections tunneled by the air bridges but rather by the wall areas of the upholstered part 3 that are free of air bridges. As a result, a highly stable anchoring of the seams 11 is achieved on the upholstered part 3.

Figure 2:
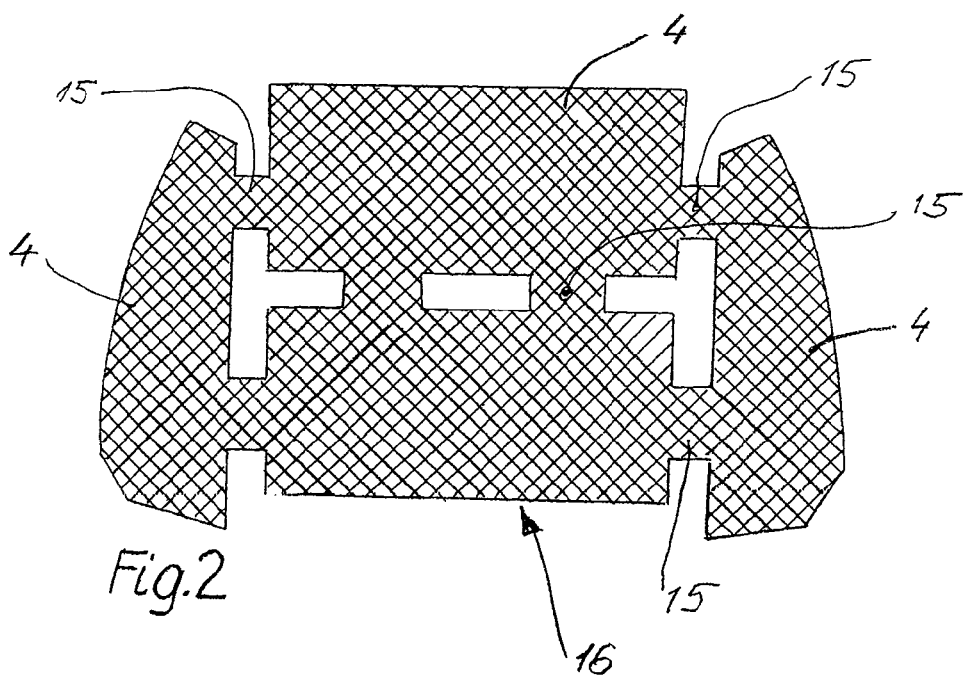
FIG. 2 is a simplified schematic top view of a texture blank which, including the air bridges, is in one piece.

For producing a seat module or backrest module 1 and 2 respectively, a one-piece texture blank consisting of a spacing texture is first produced; for example, the texture blank 16 according to FIG. 2 for the seat module 1 which, including the air bridges 15, comprises the sections of the intermediate layer 4 corresponding to the individual upholstery zones 12.5 . . . 12.8 of the seat module 1. Subsequently, the texture blank 16 is placed, together with the seam wire 13.2, in a foaming tool and is fixed there such that, during the foaming process, the air bridges 15 are also enclosed on the top side by the foamed material of the upholstered part 3 and the quilting wire 13.2 is embedded above the air bridges 15 in the upholstered part 3. In order to prevent the foamed material from penetrating into the spacing texture during the foaming process, the texture blank 16 has a construction that is impervious to foam on the foamed-material-side contact surfaces of the intermediate layer 4 and of the air bridges 15. After the mounting of the upholstery cover 5 and the fixing of the seams 11, the fan 9 can be mounted and the seat can be finished.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An actively ventilated vehicle seat, comprising:
   a lower air-impermeable upholstered vehicle seat part;
   an air-permeable intermediate layer;
   an upholstery cover anchored on the air-impermeable upholstered part via seams, the vehicle seat being divided into upholstery zones delimited from one another via the seams;
   air bridges extending between the individual upholstery zones transversely to the seams, the air bridges connecting the intermediate layer between the individual upholstery zones;
   wherein the air bridges are enclosed all around by the air-impermeable part, and further wherein the seams are anchored above the air bridges in the air-impermeable part;
   wherein each of the seams has a first seam wire disposed on an upholstery cover side of the seams and a second seam wire continuously embedded in the air-impermeable upholstered part, and the first and second seam wires are braced under tension by tension-proof seam clamps;
   wherein the upholstery cover comprises a foam padding and a cover material, the foam padding including air openings that extend from as cover material side of the foam padding to an air-impermeable part side of the foam padding; and
   wherein the cover material, the foam padding and the air-impermeable part are held in contact with each other along the seams by the seam clamps.

2. The vehicle seat according to claim 1, wherein the intermediate layer and the air bridges are formed of a spacer fabric.

3. The vehicle seat according to claim 2, wherein the spacer fabric of the air bridges and the spacer fabric of the intermediate layer are produced as a one-piece spacer fabric blank.

4. The vehicle seat according to claim 1, further comprising seam parts embedded in the air-impermeable material of the air-impermeable part above the air bridges, the seam parts extending continuously along the seams.

5. The vehicle seat according to claim 1, wherein the air-impermeable part comprises a foam material, the air bridges being impervious to foam on contact surfaces with the foamed material.

6. The vehicle seat according to claim 1, wherein the air-impermeable upholstered part is at least one of a seat part and backrest part.

7. An actively ventilated vehicle seat, comprising:
   one of a lower air-impermeable seat part or a lower air-impermeable backrest part;
   an air-permeable intermediate layer made of a spacer fabric;
   an upholstered cover;
   wherein the vehicle seat is divided into upholstery zones which are delimited from one another via seams anchoring the upholstered cover to the air-impermeable seat part or backrest part;
   air bridges extending transversely to the seams for connecting the intermediate layer between the individual upholstery zones; and
   wherein the air bridges are integrated all around into the air-impermeable seat or backrest part, and the seams are anchored above the air bridges in the air-impermeable material of the seat or backrest part that covers the air bridges; and wherein each of the seams has a first seam wire disposed on an upholstery cover side of the seams and a second seam wire continuously embedded in the air-impermeable upholstered part, and the first and second seam wires are braced under tension by tension-proof seam clamps wherein the upholstered cover comprises a foam padding and a cover material, the foam padding including air openings that extend from a cover material side of the foam padding to a lower air-impermeable part side of the foam padding; and wherein the cover material, the foam padding and the one of the lower air-impermeable seat part or lower air-impermeable backrest part are held in contact with each other along the seams by the seam clamps.

8. The vehicle seat according to claim 7, wherein the air bridges are made of the spacer fabric, and the air bridges and the intermediate layer are produced as a one-piece spacer fabric blank.

* * * * *